Sept. 12, 1967  W. M. ALLEN  3,340,556
BROOM
Filed Aug. 23, 1965  3 Sheets-Sheet 2
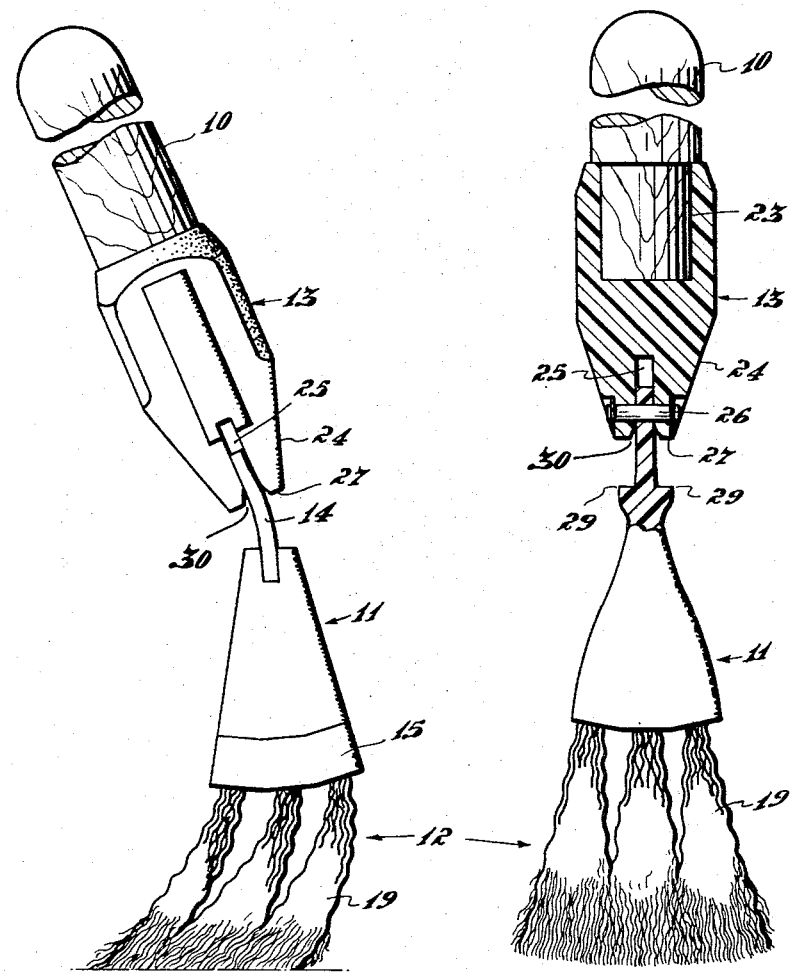
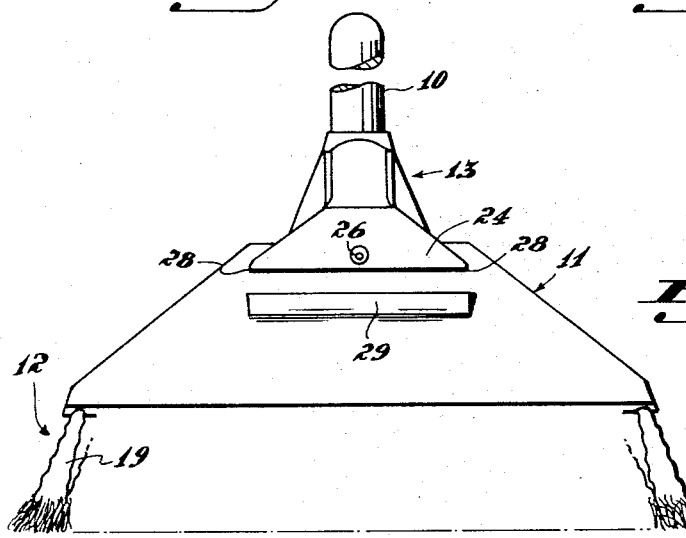
INVENTOR
William M. Allen
BY
Wood, Herron & Evans
ATTORNEYS Sept. 12, 1967     W. M. ALLEN     3,340,556

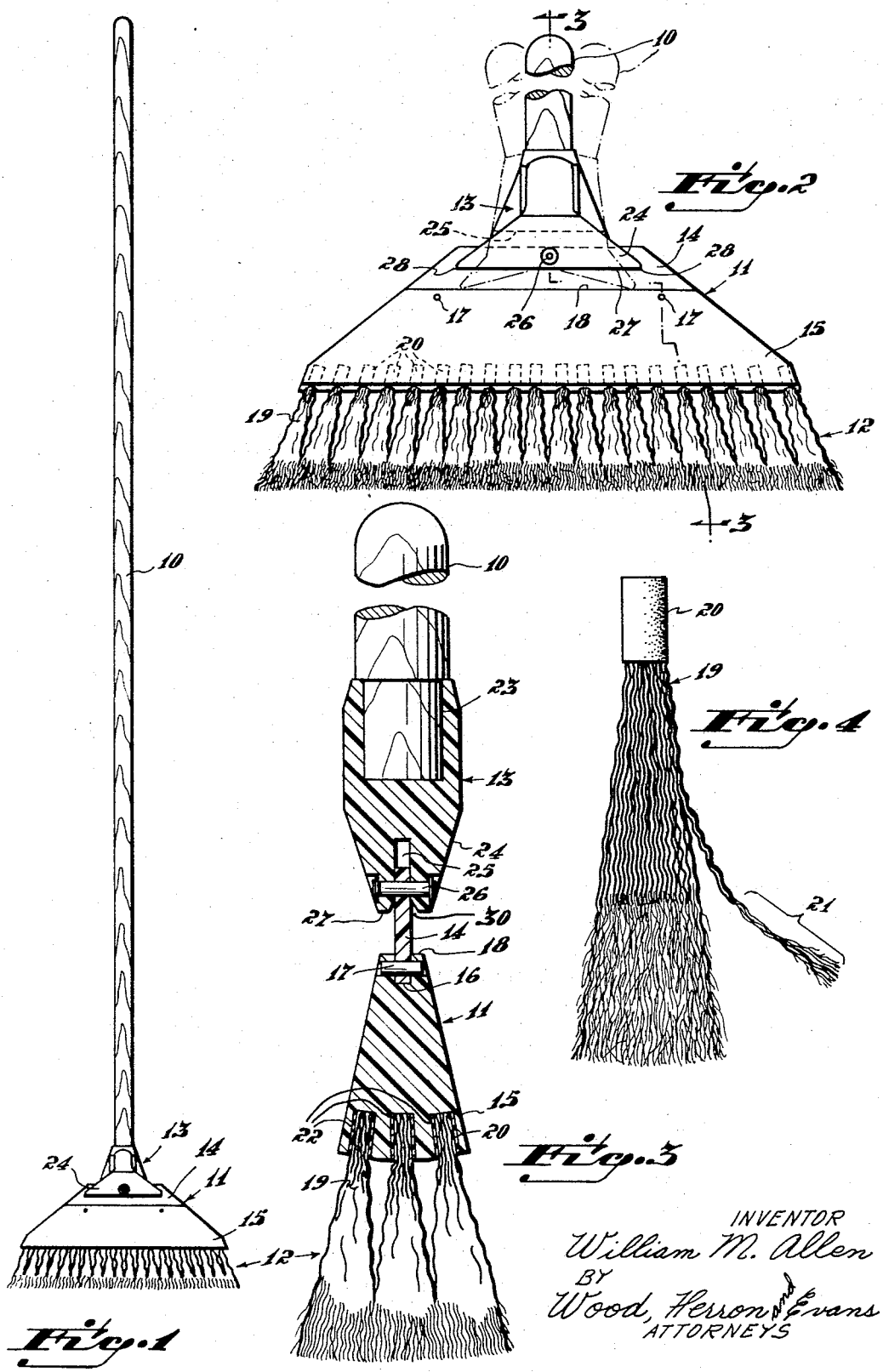

BROOM

Filed Aug. 23, 1965     3 Sheets-Sheet 3

INVENTOR
William M. Allen
BY
Wood, Herron and Evans
ATTORNEYS

United States Patent Office 3,340,556
Patented Sept. 12, 1967

3,340,556
BROOM
William M. Allen, Cincinnati, Ohio, assignor to Battelle Memorial Institute, Columbus, Ohio, a corporation of Ohio
Filed Aug. 23, 1965, Ser. No. 481,730
10 Claims. (Cl. 15—159)

ABSTRACT OF THE DISCLOSURE

A broom that includes, for example, an elongated, rigid handle; a head of plastic material, the upper portion of which is resilient and capable of moving back and forth with respect to a path when the broom is being used; a multiplicity of plastic bristles projecting from the underside of the broom head, the bristles being flagged in their lower endwise position wherein the aggregate of all flagged ends forms a substantially continuous dense mat across the sweeping surface of the broom; and rigid means interconnecting the upper portion of the head to the handle, the rigid means including means to permit limited movement between the head and the handle so that the upper end of the handle may be moved toward the sides of a path being swept.

---

This invention relates to brooms and it is directed in particular to an improved broom, the head and bristles of which are made of plastic materials.

Plastics have been used for brooms of different designs and constructions in the past. These materials have many advantages over natural fibers such as broomcorn that has been so widely used in the past for household brooms. Bristles of broomcorn wear out comparatively rapidly, whereas plastic bristles have excellent wear characteristics. Moisture deteriorates broomcorn so that a broom having such bristles cannot be used wet for very long. Plastic bristles are not affected by moisture and some plastic materials are adapted to resist strong detergents that completely ruin cornbroom bristles.

Thus, plastic materials appear to be a logical selection for brooms. Despite this, brooms of plastic have not displaced corn brooms in the market place. Apparently most housewives do not like them.

Some of the reasons for their not being liked are fairly obvious. The plastic bristled brooms heretofore available have "flicked" dirt particles, making sweeping difficult and making it difficult to collect particles into a pile for removal with a dust pan. Plastic brooms have skidded on tile and hardwood floors and in many instances they have not cleaned as well as traditional brooms having natural fibers. It might be fair to say that an all inclusive reason for housewives not liking the plastic brooms available in the past is that they simply have not had the "feel" of a traditional broom when being used for sweeping.

Therefore, one of the objectives of this invention has been to provide a plastic broom having the "feel" of a traditional broom.

Another objective of the invention has been to provide a broom that is a better cleaning implement than brooms of the past. For example, tests show that the cleaning efficiency of the broom of this invention is approximately twice that of the traditional corn broom. Further, it is especially efficient in the sweeping of fine dust. The plastic brooms of the past have not been effective for this type of cleaning.

Another objective has been to provide a plastic broom that has a comparatively low profile so that it can be used to clean in confined places such as under low furniture and under household appliances. Also, this small size makes storage easier in today's apartments and houses where broom closets are seldom found.

Another objective has been to provide a broom of the type set forth that is light in weight for ease of handling by a housewife.

A further objective of this invention has been to provide a broom of the type set forth that has comparatively high column strength. By "column strength" is meant resistance of the bristles against collapsing when a downward force is applied on the handle and the ends of the bristles are against the floor. For example, the broom of this invention resists such a downward force on the handle of approximately twenty pounds, which is about equal to the resistance of a corn broom of good quality, but over twice the resistance of plastic brooms of the past. This means that greater "scrubbing action" can be applied to difficult-to-clean areas, such as an area having mud caked on it.

Another, and important, objective of the invention has been to provide a broom of the type set forth in which limited pivotal movement is provided between the head and handle such that the head adjusts to the surface being swept to bring the bristles at both ends of the head into contact with the surface despite the handle being angulated with respect to that surface.

Other objectives and advantages of the invention will be readily apparent to those skilled in the art from the following detailed description of the drawings in which:

FIGURE 1 is an elevational view of a broom incorporating principles of this invention.

FIGURE 2 is an enlarged view, similar to FIGURE 1, with the handle broken away and illustrating the manner in which the handle can be pivoted from side to side.

FIGURE 3 is an enlarged cross-sectional view taken on the line 3—3 of FIGURE 2.

FIGURE 4 is an enlarged side elevational view of one of the preferred types of tufts employed for the bristles of the broom.

FIGURE 5 is a side elevational view illustrating the manner in which the head and bristles of the broom flex while in use.

FIGURE 6 is a view similar to FIGURE 3 illustrating another embodiment of the invention.

FIGURE 7 is a diagrammatic side view of the broom shown in FIGURE 6.

Figure 8:
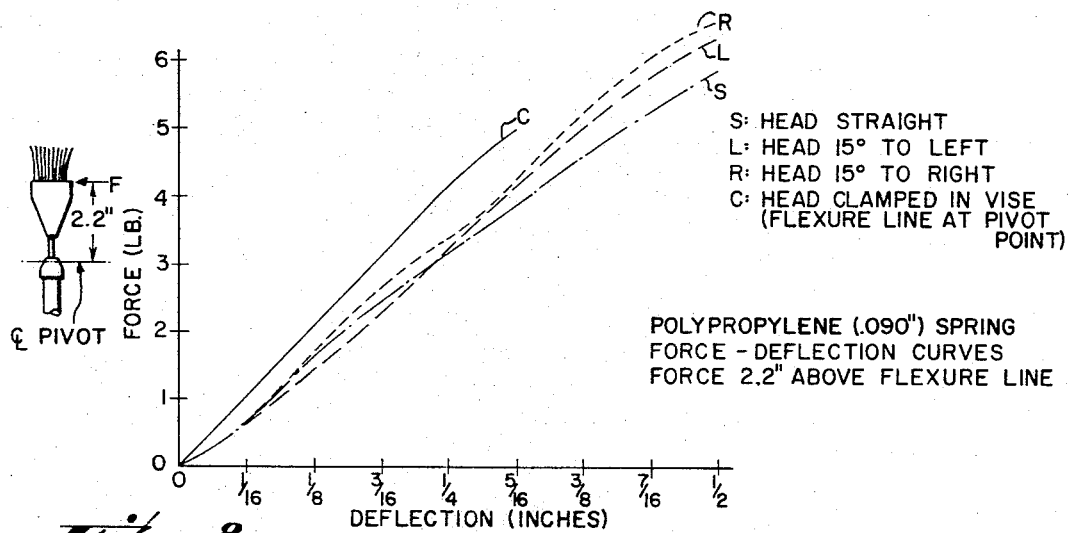
FIGURE 8 is a chart showing the force-deflection curves of the flexure of the resilient head of the broom. At the left of the chart there is a diagram showing the manner in which the force was applied to the head of the broom.

The broom of this invention comprises generally a handle 10 that may be made of wood, as is conventional. The remainder of the broom, except for minor parts, is made of plastic materials. This includes a head 11, a portion of which is resilient, bristles 12 and a connector 13. Two forms of the head are shown. In FIGURES 1 through 5, the head is made of two parts. In FIGURE 6 it is a one-piece construction. As will be seen the two forms are full equivalents.

Referring first to the head shown in FIGURES 1 through 5, it comprises a spring portion 14 and a bristle receiving portion 15. As best shown in FIGURE 3, the upper edge of the bristle receiving portion is slotted as at 16 and the spring portion 14 is seated in this slot and held therein by means such as two spaced rivets 17. An appropriate adhesive, may be utilized to join the spring portion 14 to the bristle receiving portion 15 to provide an integral head. In the preferred embodiment of the invention, the two sides of the head slant outwardly and downwardly as best shown in FIGURE 2, the angle shown being approximately 38°. It is also preferred, as shown in FIGURE 3, that the bristle receiving portion of the head have its opposing faces slanting upwardly and inwardly. The preferred material for the spring portion of the head is polypropylene. The bristle receiving portion 15 may be made of a material such as polyolefin. Other materials such as some of the rigid polyvinyl chlorides may be employed, these materials being given by way of example only.

As stated, one of the main objectives of this invention has been to provide a small broom, one having a small head and short bristles, that has the "feel" of the conventional and comparatively much larger corn brooms. For example, in the preferred embodiment illustrated, the bristle receiving portion of the head is only approximately 1.7 inch from top to bottom. Further, the bristles project from the head approximately this same distance. From tip to tip the bottom of the head shown is 8.7 inches. The distance across the bottom is just a little over an inch. Across the top at groove 16, the dimension is approximately .4 inch and since the polypropylene spring portion 14 is approximately .09 inch thick, this leaves two shoulders 18—18 at the sides of slot 16, the functions of which will be described. It is preferred that the bottom of the bristle receiving portion 15 of the head be curved from face to face as appears in FIGURE 3. This curvature preferably is on a three inch radius. The spring portion 14 is approximately one inch high, including that part that is within slot 16.

The bristles of the broom are in the form of tufts, one of which is illustrated in FIGURE 4 at 19. In this tuft, it is preferred that approximately 70 individual bristles be gathered and banded together at their upper ends by means of a collar 20. Each individual bristle is crimped throughout its length and in the lower portion 21 thereof it is flagged to provide a multiplicity of fibers. As a result of the crimping and the flagging each tuft expands outwardly and downwardly so that the lower, flagged end thereof is substantially greater in diameter than the upper end that is banded by collar 20.

In the instance shown, the tufts are arranged in three rows. As best appears in FIGURE 3, the tufts in the middle row are received in holes such as the one shown at 22, the axes of which reside in a vertical plane that passes through the middle of the head going from tip to tip thereof. The other two rows of holes are centered on planes that are angulated upwardly and inwardly toward one another approximately 7½ degrees with respect to the middle plane. Further, it is also preferred that the holes in all three rows be relatively progressively angulated in going from the center of the broom outwardly in both directions toward the tips of the head. Thus, as viewed in FIGURE 2, the axes of the two outer holes adjacent the tips of the head are angulated at approximately 20 degrees to the vertical. An important consideration in this construction is that the arrangement and spacing of the holes in the bottom of the broom head are related to the diameters of the flared ends of the tufts such that a substantially continuous, dense mat of flagged fibers are provided at the sweeping face of the broom. Further, due to the angulation of the two outer rows with respect to the middle row and the curvature provided at the underside of the head, the three rows are progressively brought onto a surface swept during a sweeping stroke.

The tufts may be formed utilizing a conventional staple machine. Under these circumstances the individual bristles are twice as long as those illustrated. Each tuft is doubled at the middle of the bristles, and the doubled over portion inserted into a hole in the underside of the head. In these circumstances it is preferred that there be approximately 35 individual bristles such that 70 bristle ends are exposed to a surface being swept. Further, it is to be understood that the bristle pattern may be a staggered one instead of one in which the three rows are aligned as illustrated in FIGURE 2.

The short bristles that characterize the broom of this invention have a number of advantages, in addition to costing less, than the long bristles used heretofore in plastic brooms. There is even an advantage in the manufacture of the broom using a conventional stapling machine, because the shortness of the bristles calls for a short stroke of the stapling machine as the bristles are being inserted. Further, there is very little tendency, if any, for the bristles of this invention to go "wild." Long bristled brooms should be hung up when not in use, because the long bristles bend and take a set after the broom stands for long periods on the bristles. The short bristles of the broom of this invention are so resistant to bending under these circumstances that the broom can be stood on the bristles indefinitely.

The connector 13 by which the head of the broom is attached to the handle preferably is of a rigid plastic material, such as a polyvinyl chloride polymer. The upper part of the connector has a socket 23 therein to receive the lower end of broom handle 10. Alternatively, the socket may be threaded to receive a threaded lower end of the broom handle, or adhesives may be used as well as other known fastening devices. The lower portion of this connector comprises two wings 24-24 that slant outwardly and downwardly as shown in FIGURE 2. A cross slot 25 is provided between wings 24—24 and this slot receives the upper edge of the spring portion 14 of the broom head. A single pivot device such as rivet 26 holds the spring portion of the head in slot 25. This rivet 26 is centered with respect to the upper edge of the spring so that the broom head is in balance on it. The lower edges 27—27 of wings 24—24 are straight and parallel the shoulders 18—18, being spaced approximately .4 of an inch from the shoulders. The tips 28—28 of the wings 24 provide abutments so that the handle may be pivoted relative to the head about rivet 26 from side to side within the limits defined by the wing tips. Preferably, the handle may be swung through 15 degrees to either side of the vertical, or through a total arc of 30 degrees. Thus, when the broom is held with the handle at an angle within the prescribed limits, the head automatically adjusts itself to the surface being swept to bring all bristles into contact with that surface.

Preferably the fit between the spring portion and the slot 25 is such that a small amount of pressure is required to shift the head relative to the handle, with just enough friction existing between the wings 24—24 and the spring portion 14 to cause the head to remain in a set, relatively angulated position from sweeping stroke to sweeping stroke. It is pointed out, however, that this friction need only be nominal because of the balanced nature of the head on the connector due to the single pivot axis provided by rivet 26.

In the embodiment of the invention shown in FIGURE 6, the head is molded of a material such as polypropylene in one piece with the two faces of the head tapering in from bottom to top so that an area in the upper portion of the head is provided that has the same flexure of the spring portion of the embodiment of FIGURES 1 through 5. In this embodiment, it is preferred that abutments such as those shown at 29—29 be provided to receive the tips 28 of wings 24—24 of the connector 13 in order to limit the angular motion of the head with respect to the handle. Alternatively, the slot 25 may be dimensioned so that its opposite ends serve as abutments against which the upper edge of the head may strike to limit the angular motion.

Referring to FIGURE 5, which shows the broom nearing the completion of a sweeping stroke made from left to right, it may be seen that the bristles flex due to the friction existing between the continuous, dense mat of the sweeping surface of the broom and the surface being swept. Additionally, however, the spring portion of the broom also flexes or bends. It is preferred that the resistance to bending of the spring portion be slightly greater than that of the bristles collectively.

It is believed that one of the reasons that the broom of this invention has the "feel" of a long bristled corn broom, in spite of the use of short bristles which are relatively stiffer than long bristles, is that the stiffness is compensated for by the spring portion of the head, and it appears that a better "feel" is obtained by having the spring portion of the head just slightly more resistant to flexing than the bristles collectively are resistant to flexing.

Figure 9:
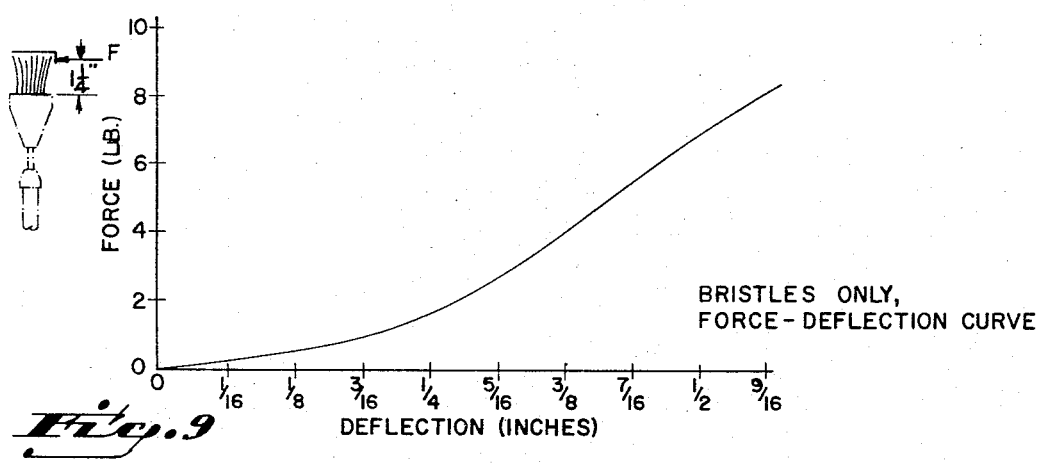
FIGURE 9 is a chart showing the force-deflection curve upon the flexing of the bristles only in the manner as indicated in the diagrammatic view at the left of the chart.
Figure 10:
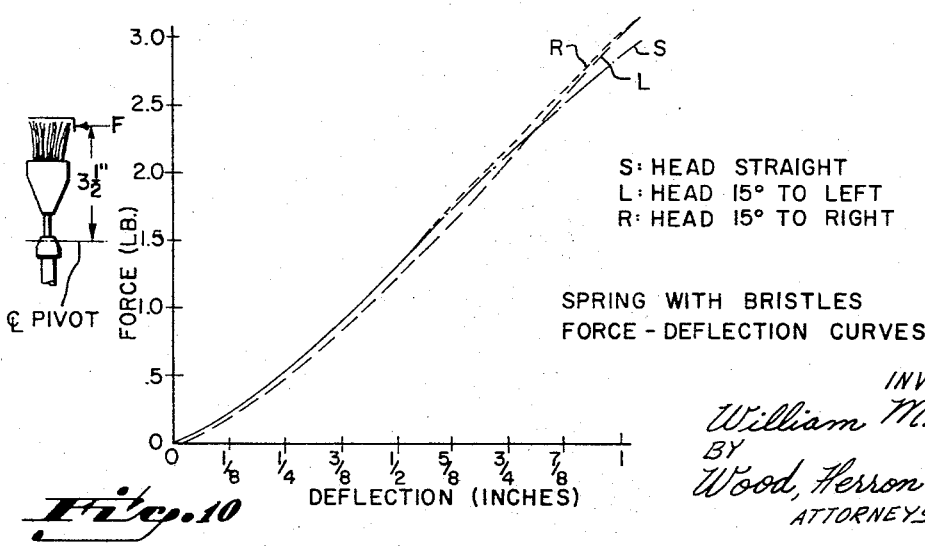
FIGURE 10 is a chart showing the force-deflection curves in which the flexure of the head and bristles were tested as shown in the diagram at the left of the chart.

The charts of FIGURES 8, 9 and 10 show the preferred ranges of flexure for the bristles and for the spring portion of the head and for the combination of bristles and spring portion. As shown in FIGURE 8, when the spring portion only of the head is flexed the degree of flexure is substantially the same when the head is straight relative to the handle and when the head is 15° to the left and 15° to the right. However, it is found that when the handle is canted 15° with respect to the head as illustrated in FIGURE 2, to the left for example, the area of the connector adjacent a wing tip 28 that is in contact with abutment 18 stiffens that portion of the resilient part 14 of the head so that the left end of the broom is stiffened so that more scrubbing pressure can be applied at that end of the broom on stubborn dirt. What happens in these circumstances is that the wing at the opposite end of the connector frees a substantial portion of the resilient part 14 so that it has a greater degree of flexure, thus compensating for the relative stiffness at the left side and resulting in the curves shown.

In the tests wherein the bristles only were deflected, an L-shaped pressure plate was used and the force applied against one side of this plate at a point 1¼ inch away from the bottom of the head as shown in the diagram at the left of Chart 9. The chart of FIGURE 10 shows the force-deflection curves under circumstances in which both the head and bristles are flexed. In this test, the same L-shaped plate used in the flexing of the bristles only was used. This chart shows that in these circumstances the flexure is the same whether the head is straight with respect to the handle or 15° to either the left or right of the handle.

The forced deflection curves of the three charts illustrate desirable flexure characteristics for the parts of the broom, these characteristics resulting in the desirable "feel" to which reference has been made.

Having described my invention, I claim:

1. A broom comprising an elongated, rigid, handle,
   a head of plastic material, the upper portion of which is resilient and capable of flexing back and forth with respect to a path being swept when the broom is in use,
   a plurality of plastic bristles projecting from the underside of said head, the projecting portions of said bristles being all substantially the same length within a size range of from 1¼ to 2½ inches, and,
   rigid means interconnecting said upper portion of said head to said handle, including means to permit limited relative pivotal movement between said head and said handle such that the upper end of said handle may be moved toward a side of said path.

2. A broom as set forth in claim 1 in which said head is of one piece construction.

3. A broom as set forth in claim 1 in which said upper portion of said head is a uniform thickness of a plastic material having the characteristics of polypropylene.

4. A broom comprising an elongated, rigid, handle,
   a head of plastic material, the upper portion of said head being flexible and capable of bending back and forth with respect to a path being swept when the broom is in use,
   a plurality of tufts of plastic bristles projecting from the underside of said head, said bristles being no longer than 2½ inches, and,
   rigid means interconnecting the flexible portion of said head to said rigid handle, said means including pivot means to permit limited movement of the upper end of said handle toward the sides of the path being swept.

5. A broom comprising an elongated, rigid, handle,
   a head that is made of a plastic material characterized as being rigid in the areas of the head adjacent the lower portion thereof and flexible in the areas adjacent the upper portion thereof to permit flexing of the upper portion of the head back and forth with respect to a path being swept when the broom is in use,
   a multiplicity of tufts of plastic bristles projecting from the underside of said head a distance of substantially two inches, the lower endwise portions of said bristles being flagged to an extent to substantially fill the area in which the ends of said bristles terminate, and,
   rigid means interconnecting the flexible portion of said head to said rigid handle, said means including pivot means to permit limited movement of the upper end of said handle toward the sides of a path being swept.

6. A broom as set forth in claim 1 in which said plastic bristles are flagged in their lower endwise portions, whereby the aggregate of all flagged ends forms a substantially continuous, dense mat across the sweeping surface of said broom.

7. A broom comprising an elongated, rigid, handle,
   a head of plastic material, the upper portion of which is resilient and capable of flexing back and forth with respect to a path being swept,
   a multiplicity of tufts of plastic bristles projecting from the underside of said broom a distance of approximately two inches, said tufts collectively capable of flexing back and forth with respect to a path being swept to a degree greater than that of said upper portion of said head,
   rigid connector means having a socket in the upper portion thereof receiving the lower end of said handle and a cross slot in the lower portion thereof receiving the marginal area of the upper portion of said head,
   pivot means fastening said connector means to said head and adapted to permit the upper end of said handle to be moved toward the sides of a path being swept, and,
   abutment means limiting the movement of said handle toward said sides to an arc of approximately 30 degrees.

8. A broom comprising an elongated, rigid, handle,
   a head of plastic material, the upper portion of which is resilient and capable of flexing back and forth with respect to a path being swept when the broom is in use,
   a plurality of tufts projecting from the underside of said head, all of said tufts being substantially of the same length and being within a size range of from 1¼ to 2½ inches,
   each of said tufts comprising a multiplicity of crimped, plastic bristles,
   means at the upper end only of each tuft banding said bristles into a tightly bound cylindrical cluster, whereby the crimping of the bristles not so bound causes the tufts to flare outwardly progressively downwardly,
   the underside of said head having a pattern of openings therein in which the means banding the upper ends of the tufts are received,
   said pattern of openings being spaced such that the aggregate of all flagged ends of the bristles form a substantially continuous, dense mat across the sweeping surface of said broom, and, rigid means interconnecting said upper portion of said head to said handle, including means to permit limited relative pivotal movement between said head and said handle such that the upper end of said handle may be moved toward a side of said path.

9. A broom comprising an elongated, rigid, handle, a head that is made of plastic material characterized as being rigid in the areas of the head adjacent the lower portion thereof and flexible in the areas adjacent the upper portion thereof to permit flexing of the upper portion of the head back and forth with respect to a path being swept when the broom is in use,
a multiplicity of plastic bristles projecting from the underside of said head, the lower endwise portions of said bristles being flagged to an extent to substantially fill the area in which the ends of said bristles terminate, and
rigid means interconnecting said flexible portion of said head to said rigid handle, said means including pivot means to permit limited pivotal movement of the upper end of said handle toward the sides of a path being swept.

10. A broom comprising an elongated rigid handle, a resilient head, said head having a resilient portion made of plastic material that is capable of flexing back and forth with respect to a path being swept when the broom is in use,
a multiplicity of crimped, plastic bristles projecting from the underside of said head, said bristles collectively capable of flexing back and forth with respect to a path being swept to a degree greater than that of the resilient portion of said head, and
rigid means interconnecting said resilient head to said rigid handle, said means including pivot means centered in the upper portion of said head such that the head is normally in balance on said pivot means and said handle is adapted for limited movement toward the sides of a path being swept.

References Cited
UNITED STATES PATENTS

| | | | |
|---|---|---|---|
| 454,757 | 6/1891 | Newbaker | 15—143 |
| 1,049,238 | 12/1912 | Hope | 306—20 |
| 2,975,454 | 3/1961 | Bernstein | 15—144 X |
| 3,119,138 | 1/1964 | Davis | 15—245 X |

FOREIGN PATENTS 1,085,863  8/1954  France.

CHARLES A. WILLMUTH, *Primary Examiner.*

PETER FELDMAN, *Assistant Examiner.*